Dec. 28, 1926.
W. E. TRUMPLER
1,612,330
PULSATING TORQUE MACHINE
Filed Dec. 15, 1924
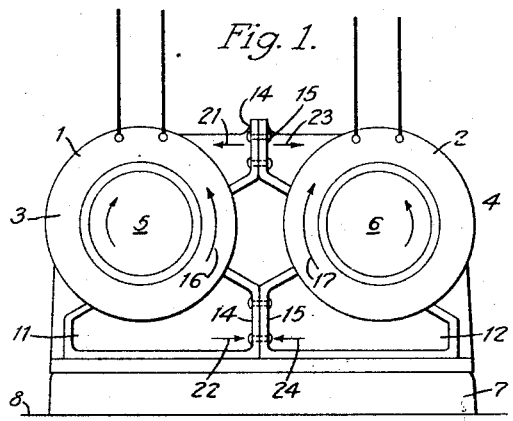
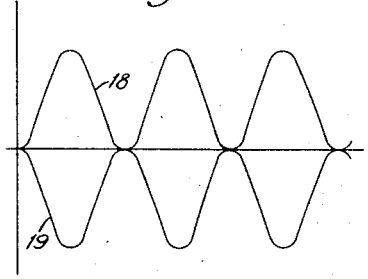
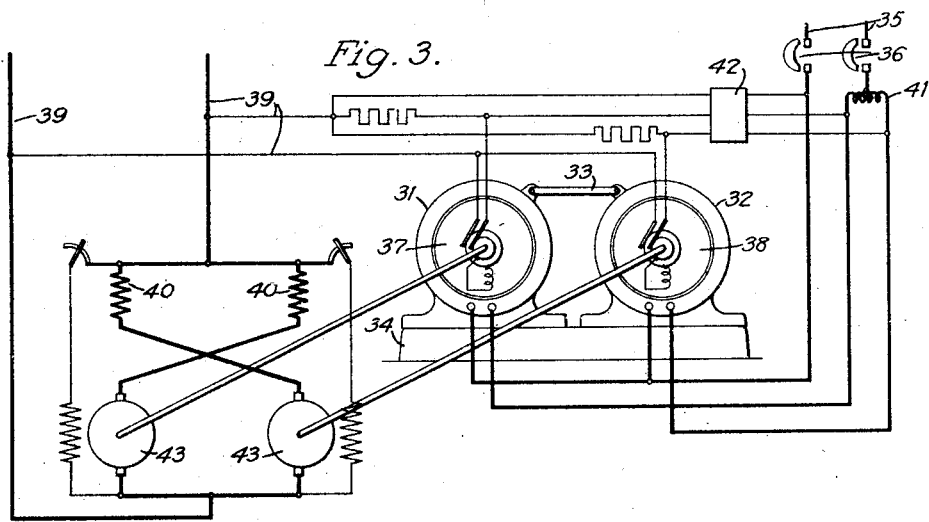
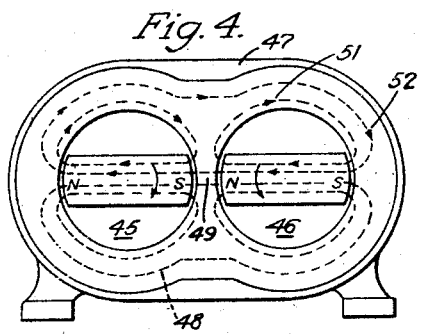
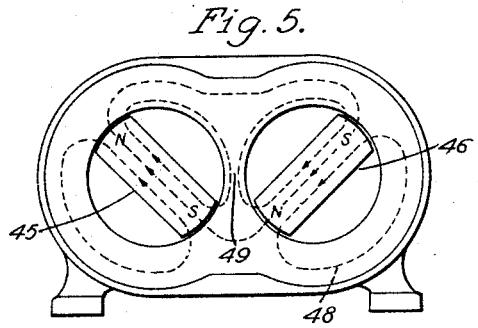
WITNESSES:
G. S. Neilson
S. M. Pineles
INVENTOR
William E. Trumpler
BY
Wesley G. Carr
ATTORNEY Patented Dec. 28, 1926.

1,612,330

UNITED STATES PATENT OFFICE.

WILLIAM E. TRUMPLER, OF WILKINSBURG, PENNSYLVANIA, ASSIGNOR TO WESTINGHOUSE ELECTRIC & MANUFACTURING COMPANY, A CORPORATION OF PENNSYLVANIA.

PULSATING-TORQUE MACHINE.

Application filed December 15, 1924. Serial No. 755,859.

My invention relates to pulsating-torque machines and it has particular relation to machines transmitting torques which tend to introduce periodical forces into a foundation or supporting structure.

The power transmitted by single-phase machines is not uniform but pulsates at a frequency which is twice the frequency of the currents flowing through the machine, thereby producing reactive pulsating forces between the stator of the machine and its foundation.

The periodical forces acting upon the foundation cause vibrations which may become dangerous for the surrounding structures and it is imperative to reduce, as much as possible, the magnitude of such forces whenever the machines are of any considerable size.

One object of my invention is to so combine a plurality of individual machines, each exercising a pulsating reaction, that the reactive forces exercised by the individual machines may balance or neutralize each other.

A more particular object of my invention is to combine two single-phase dynamo-electric machines into a single unit, and to cause the reactive forces exerted by one machine to be opposed by the reactive forces exerted by the other machine, thus reducing the resultant forces transmitted into the foundation.

In accordance with my invention, I may, for instance, join two single-phase machines, having identical mechanical and electrical characteristics, by providing a single rigid stator structure for both machines and operating the machines in opposite directions. The pulsations of one machine are bucked by those of the other machine, thus eliminating unbalanced forces from the foundadation.

To obtain the maximum effect, it is required that the power pulsations in both machines shall be equal in magnitude and in phase.

The foregoing and other objects of my invention will best be understood by reference to the accompanying drawing, wherein—

Figure 1 is an elevational view of a double unit embodying my invention,

Fig. 2 is a diagram illustrating the torque pulsations corresponding to the power transmitted through the machines, Fig. 3 is a diagram illustrating the electrical connections of a double unit embodying my invention, Fig. 4 is a view, similar to Fig. 1, illustrating a modification of my invention, and Fig. 5 is a diagrammatic view explanatory of Fig. 4.

Referring to Fig. 1, two single-phase dynamo-electric machines 1 and 2 of identical mechanical and electrical construction are disposed parallel to each other and comprise stators 3 and 4 and rotors 5 and 6, respectively. The stators 3 and 4 are supported upon a common bedplate 7 which may be secured upon a foundation 8. The connections between the stators and the bedplate comprise supporting brackets 11, 12 which have lateral extensions or abutments 14, 15 connected by bolts. The two stators constitute a practically rigid, unitary structure.

The rotors of the two machines are connected to power-transmitting devices (not shown) which are so arranged with respect to the two machines 1 and 2 that the mechanical and electrical similarity between the same is in no way disturbed.

In operation, the two machines rotate in opposite directions and transmit pulsating power which subjects the stators 3 and 4 of the two machines, respectively, to torque pulsations in the directions indicated by the arrows 16, 17 and illustrated, as to phase and magnitude, by the curves 18, 19 of Fig. 2. With each machine acting individually, the torque pulsations will be fully transmitted to the bed plate 7 and the foundation 8. However, since the stators of the two machines are rigidly connected, the pulsating turning moment or couple 21, 22, exercised by the stator 3 of one machine, is opposed by the equal but oppositely directed couple 23, 24 exercised by the stator 4 of the second machine, thus restricting the play of the pulsating forces to within the machine aggregate and eliminating forces tending to produce vibratory motion thereof.

Elimination of the periodical forces from the foundation will take place only if the torque pulsations appearing in the stators of the two machines are identical as to magnitude and phase, as shown in Fig. 2. Variations in phase or in shape of the curves 18 and 19, illustrating the torque pulsations in the machines, will result in the production of a pulsating resultant force which will react upon the foundation and should be avoided, if possible.

Special provisions may be made in order to insure coincidence of magnitude and phase of the torque pulsations in the two machines. Thus, in Fig. 3 are shown electrical connections for two dynamo-electric machines 31 and 32 which are joined into a single rigid unit by a connecting rod 33 and the connections to the bed plate 34, similar to the machines illustrated in Fig. 1. The two machines 31 and 32, in this instance, are illustrated as single-phase synchronous generators which may be connected to a single-phase line 35 through circuit-breakers 36. The rotors 37, 38 of the two machines are excited from a direct-current line 39. In order to insure coincidence of the torque pulsations in the two machines, provisions are made to maintain the currents and terminal voltages equal in magnitude and in phase, respectively.

The currents are maintained equal in phase and magnitude by connecting the two machines in parallel through a balance coil 41. The voltages are maintained equal by means of regulators, indicated symbolically at 42, controlling the excitation of the two machines in response to the voltage conditions at the machine terminals.

The synchronous generators 31 and 32 are shown coupled to a pair of direct-current motors 43 having cross connected series field-windings 40 in order to help maintain uniformity in the division of the load between the two machine units.

In Fig. 4 is shown a modification of my invention wherein the two machines 45 and 46 are combined and joined into a single structure by means of a common stator frame 47.

When combining two machines in accordance with my invention, it may be necessary or desirable to reduce the overall width. To secure such result, the machines 45 and 46 have a common magnetic core 48 upon the stator, and the rotors are placed as near each other as possible. The central portion 49 of the stator core, between the two rotors, is made of just sufficient thickness to secure the desired mechanical strength and space for the windings, and, accordingly, has a smaller radial depth than the depth required for carrying the total flux of each machine independently in a circumferential direction.

The windings of the two machines are so connected that, when the fields induced in the machines are alined, the flux in the two machines flows in the same direction, as shown by the arrows 51, 52 in Fig. 4. The major portion of the flux is thus common to both machines, threading, in succession, through the two armatures.

In the subsequent rotation of the fields of the two machines, a portion of the flux is always common to both machines, on account of the reduced magnetic capacity of the central core portion 49. The flux distribution, after a rotation of 45 degrees from the position shown in Fig. 4, is shown in Fig. 5.

I claim as my invention:

1. The combination of two parallel disposed, oppositely rotating dynamo-electric machines, each machine transmitting periodically varying forces and comprising a stator member and a rotor member, a foundation supporting said members, additional means for rigidly connecting the stator members of said two machines, whereby the reactional forces of one machine are transmitted upon the other machine, and means for maintaining substantial equality in the magnitudes and phases of the forces transmitted in the two machines.

2. In an alternating-current machine aggregate, the combination with two parallel disposed rotors, of a core common to said rotors and constituting two tubular, polar surfaces surrounding said rotors, windings on said polar surfaces for producing magnetic fields rotating in opposite directions, the portion of the core disposed between said rotors being of less depth than twice the minimum core depth at other portions of the periphery.

3. In an alternating-current machine aggregate, the combination with two parallel disposed rotors, of a core common to said rotors and constituting two tubular, polar surfaces surrounding said rotors, windings for causing said polar surfaces to be threaded by magnetic fields rotating in opposite directions, the portion of the core disposed between said rotors being of less depth than twice the minimum core depth at other portions of the periphery, said magnetic fields, when alined, threading successively through said rotors.

4. The combination of two motor-generator units adapted to interchange single-phase, pulsating electrical power and continuous electrical power, each unit comprising stator and rotor members, the stators of the units that transmit the single-phase power constituting a single, mechanically rigid body, the rotors of said units rotating in opposite directions, and the units that utilize the continuous electrical power being so connected that the loads thereon are equalized.

5. The combination of two motor-generator units adapted to interchange single-phase, pulsating electrical power and continuous electrical power, each unit comprising stator and rotor members, the stators of the units that transmit the single-phase power constituting a single, mechanically rigid body, and the rotors of said units rotating in opposite directions, and means for securing equal division of the loads and phase coincidence in the power pulsations in said units.

6. The method of operating two similar, single-phase dynamo-electric machines comprising parallel disposed stator and rotor members, said stator members constituting a single, mechanically rigid body, which comprises operating said machines with the rotors rotating in opposite directions and maintaining the currents through the two machines and the voltages across the terminals of said two machines equal in phase and in magnitude.

7. The combination with two similar single-phase, dynamo-electric machines comprising parallel disposed stator and rotor members, said stator members constituting a single, mechanically rigid body, said rotor members being arranged to rotate in opposite directions, and means for maintaining the currents through the two machines and the voltages across the terminals of said two machines equal in phase and in magnitude.

8. The combination with two similar, single-phase, dynamo-electric machines comprising parallel disposed stator and rotor members, said stator members constituting a single, mechanically rigid body, and means coupled with said rotors for interchanging substantially equal amounts of energy with said machines, the pulsating components of the stator reactions of said machines substantially neutralizing each other.

In testimony whereof, I have hereunto subscribed my name this 5th day of December, 1924.

WILLIAM E. TRUMPLER.